United States Patent
Lee et al.

(10) Patent No.: US 10,542,448 B2
(45) Date of Patent: Jan. 21, 2020

(54) METHOD FOR MEASUREMENT REPORTING AND DEVICE SUPPORTING THE SAME

(71) Applicant: LG ELECTRONICS INC., Seoul (KR)

(72) Inventors: Yejee Lee, Seoul (KR); Hongsuk Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/376,935

(22) Filed: Apr. 5, 2019

(65) Prior Publication Data

US 2019/0313270 A1    Oct. 10, 2019

(30) Foreign Application Priority Data

Apr. 5, 2018    (KR) .................. 10-2018-0039989

(51) Int. Cl.
| | |
|---|---|
| *H04B 17/00* | (2015.01) |
| *H04W 24/00* | (2009.01) |
| *H04W 24/10* | (2009.01) |
| *H04B 17/327* | (2015.01) |
| *H04W 88/02* | (2009.01) |

(52) U.S. Cl.
CPC .......... *H04W 24/10* (2013.01); *H04B 17/327* (2015.01); *H04W 88/02* (2013.01)

(58) Field of Classification Search
CPC .... H04B 17/318; H04B 17/101; H04B 17/24; H04B 10/079; H04B 17/327; H04W 24/10; H04W 36/0058
See application file for complete search history.

(56) References Cited

U.S. PATENT DOCUMENTS

| | | | |
|---|---|---|---|
| 2011/0080895 A1* | 4/2011 | Iwamura | H04W 36/0085 370/332 |
| 2012/0276911 A1* | 11/2012 | Ng | H04W 36/18 455/442 |
| 2013/0029702 A1* | 1/2013 | Cheng | H04W 24/10 455/500 |
| 2013/0040692 A1* | 2/2013 | Chen | H04W 36/04 455/525 |
| 2014/0349653 A1* | 11/2014 | Kanamarlapudi | H04W 36/0088 455/437 |
| 2015/0264403 A1* | 9/2015 | Chong | H04N 19/61 375/240.18 |
| 2016/0323868 A1* | 11/2016 | Kalhan | H04W 72/1278 |
| 2017/0325283 A1* | 11/2017 | Wu | H04W 52/0216 |
| 2018/0176934 A1* | 6/2018 | Uchino | H04W 72/085 |
| 2019/0124575 A1* | 4/2019 | Long | H04L 1/18 |

\* cited by examiner

*Primary Examiner* — Andrew Wendell
(74) *Attorney, Agent, or Firm* — Lee, Hong, Degerman, Kang & Waimey

(57) ABSTRACT

Provided are a method of measurement reporting and a device supporting the method. According to one embodiment of the present invention, the method includes: receiving a configuration of condition for measurement report; starting a first timer related to a first cell, when a report triggering event for the first cell is occurred; detecting a triggering event for a second cell and that the condition is satisfied; and reporting measurement results of the first cell and the second cell, when the first timer is expired or stopped.

15 Claims, 18 Drawing Sheets

METHOD FOR MEASUREMENT REPORTING AND DEVICE SUPPORTING THE SAME

CROSS-REFERENCE TO RELATED APPLICATIONS

Pursuant to 35 U.S.C. § 119(a), this application claims the benefit of earlier filing date and right of priority to Korean Patent Application No. 10-2018-0039989, filed on Apr. 5, 2018, the contents of which are hereby incorporated by reference herein in its entirety.

BACKGROUND OF THE INVENTION

Field of the Invention

The present invention relates to a wireless communication system, and more particularly, to a method for measurement reporting and a device supporting the same.

Related Art

Efforts have been made to develop an improved $5^{th}$-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, an aerial UE at high altitude can detect more neighbor cells than ground UE. As aerial UE can see more cells, uplink power of aerial UE can affect to more cells. The neighbor cells would be far from serving cell and would not be connected to the serving cell with X2 interface. So, UE based UL interference detection is studied. The UE can report the information of neighbor cell with existing events. However, the signal strengths of neighbor cells are similar (e.g. RSRP 90-95 dBm) at high altitude. Therefore, the reports would be triggered frequently and the signaling overhead would be increased.

SUMMARY OF THE INVENTION

According to a prior art, measurement reporting is performed too frequently and unnecessarily duplicated.

According to an embodiment of the present invention, a method performed by a user equipment (UE) in a wireless communication system is provided. The method may comprise: receiving a configuration of condition for measurement report; starting a first timer related to a first cell, when a report triggering event for the first cell is occurred; detecting a triggering event for a second cell and that the condition is satisfied; and reporting measurement results of the first cell and the second cell, when the first timer is expired or stopped.

The configuration may include information on a second timer which has shorter time-to-trigger (TTT) value than TTT value of the first timer.

The method may further comprise: starting the second timer when the triggering event for the second cell is satisfied.

The condition may be that the second timer is expired.

The measurement results may be reported when a leaving condition of the second cell is not met while the first timer and the second timer are running.

The condition may be that a number of cells whose triggering event is met is above a threshold informed by a network.

The condition may be that a sum of reference signal received power (RSRP) of cells whose triggering event is met is above a threshold informed by a network.

The method may further comprise: deleting the measurement results after reporting the measurement results.

The configuration may include information on prohibit timer.

The method may further comprise: prohibiting report of the measurement results after reporting the measurement results, while the prohibit timer is running.

According to another embodiment of the present invention, a user equipment (UE) in a wireless communication system is provided. The UE may comprise: a transceiver for transmitting or receiving a radio signal; and a processor coupled to the transceiver, the processor configured to: control the transceiver to receive a configuration of condition for measurement report; start a first timer related to a first cell, when a report triggering event for the first cell is occurred; detect a triggering event for a second cell and that the condition is satisfied; and control the transceiver to report measurement results of the first cell and the second cell, when the first timer is expired or stopped.

The configuration may include information on a second timer which has shorter time-to-trigger (TTT) value than TTT value of the first timer.

The processor may be further configured to: start the second timer when the triggering event for the second cell is satisfied.

The condition may be that the second timer is expired.

According to another embodiment of the present invention, a processor for a wireless communication device in a wireless communication system is provided. The processor may be configured to control the wireless communication device to: control the transceiver to receive a configuration of condition for measurement report; start a first timer related to a first cell, when a report triggering event for the first cell is occurred; detect a triggering event for a second cell and that the condition is satisfied; and control the transceiver to report measurement results of the first cell and the second cell, when the first timer is expired or stopped.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
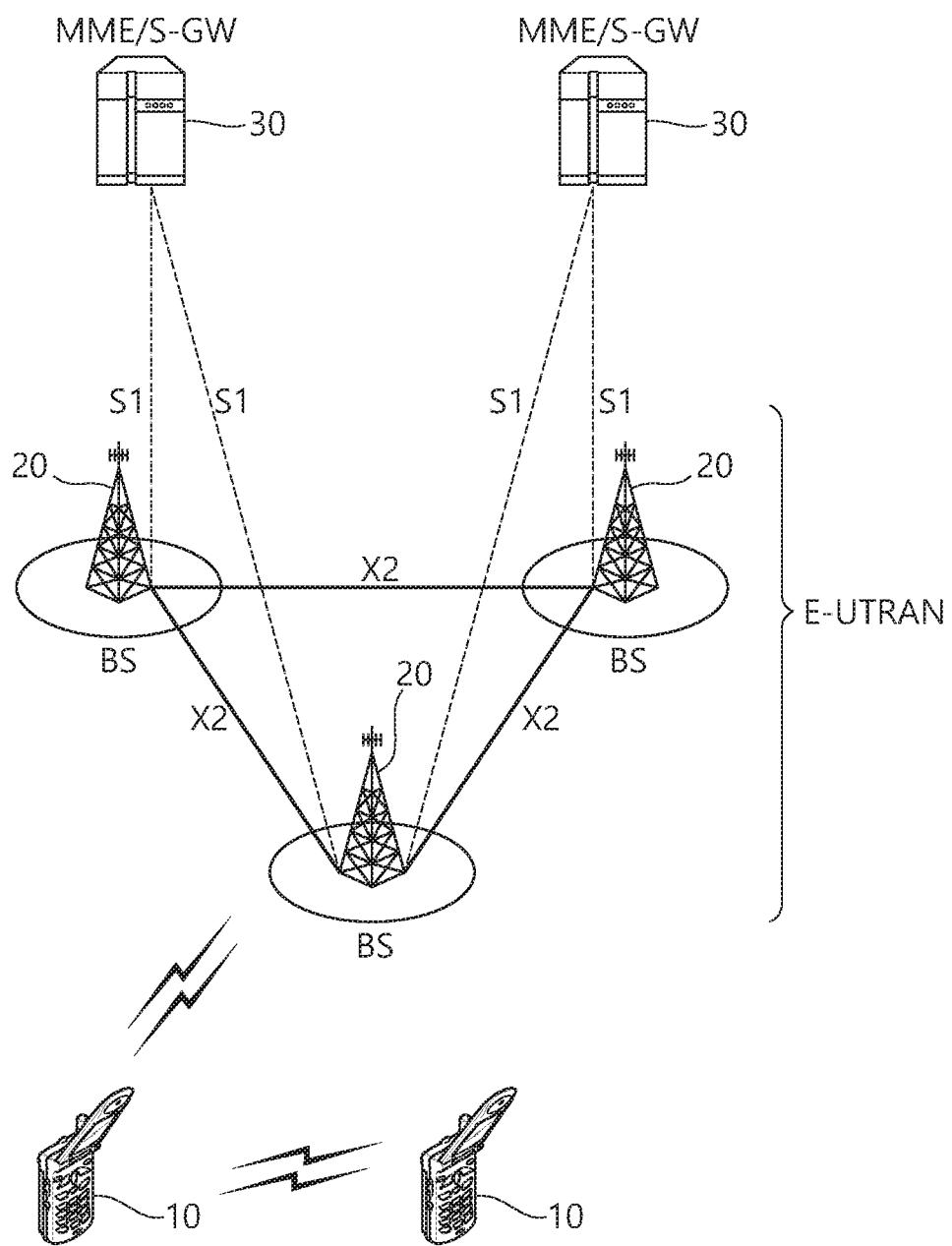
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
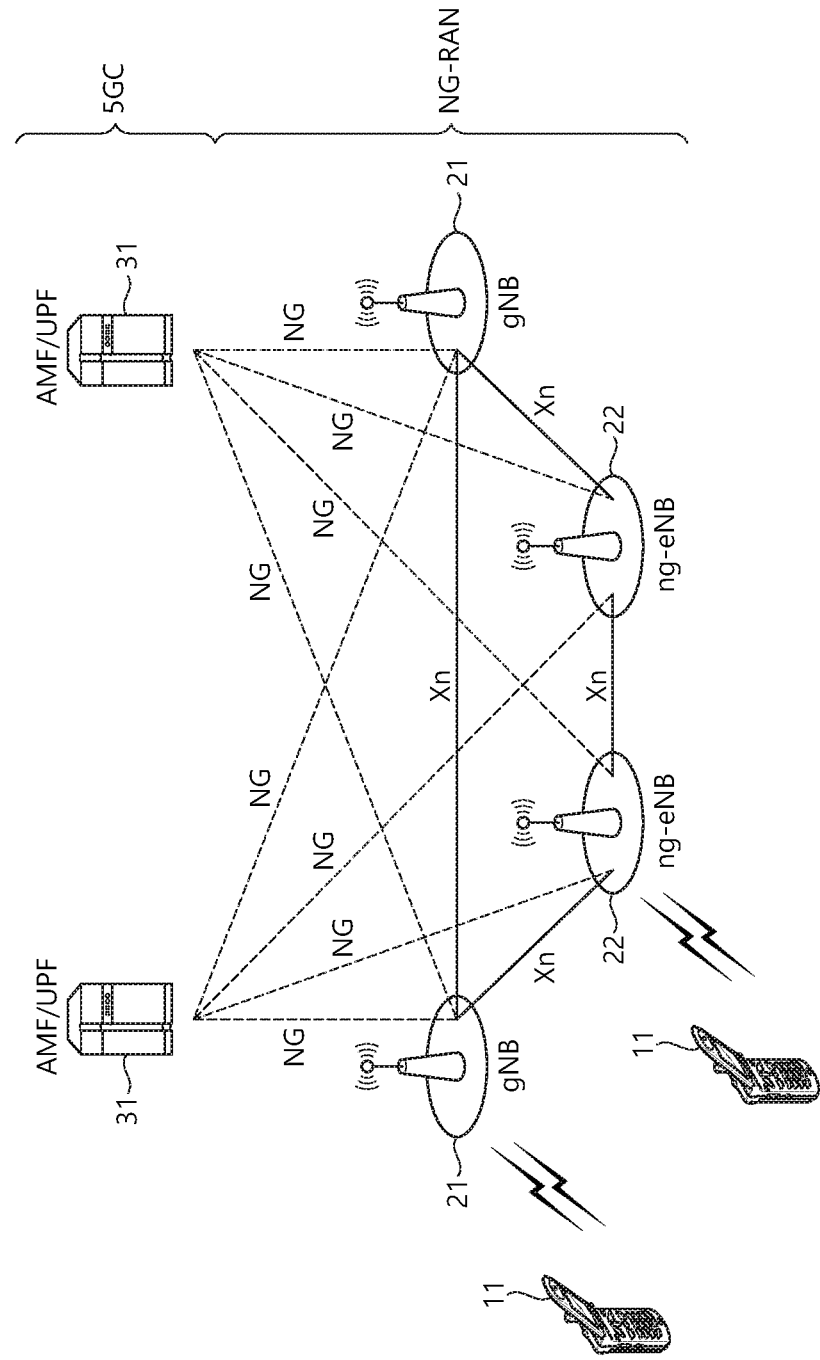
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
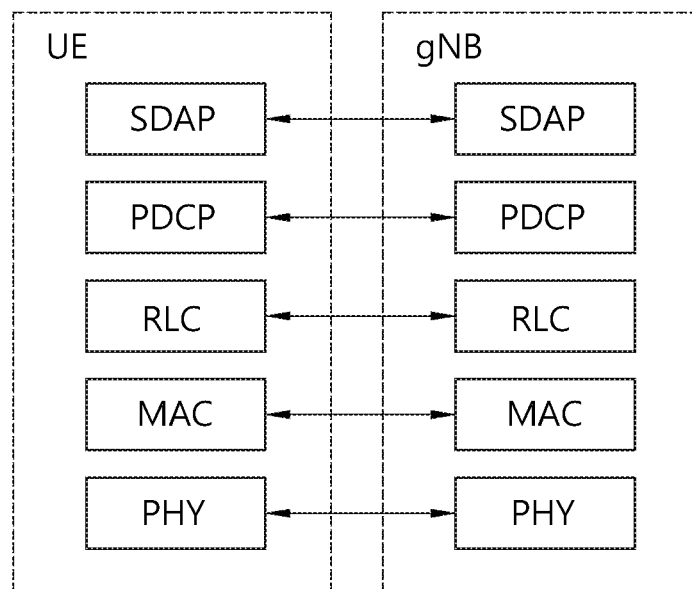
FIG. 3 shows a block diagram of a user plane protocol stack to which technical features of the present invention can be applied.
Figure 4:
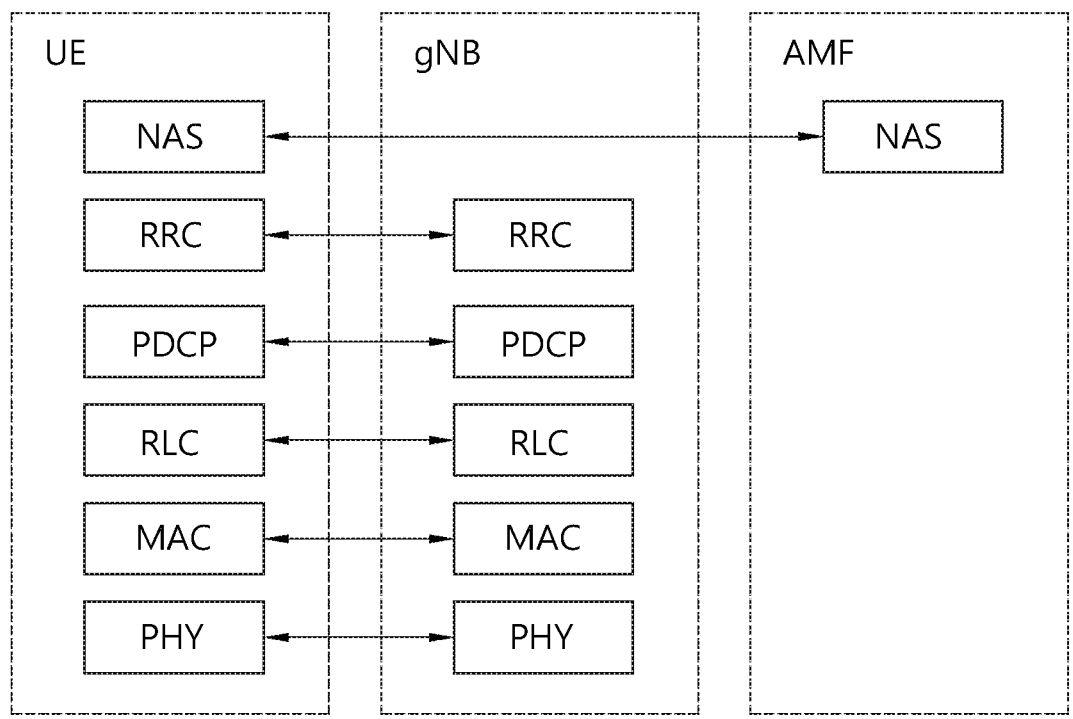
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Measurement reporting is described.

The purpose of this procedure is to transfer measurement results from the UE to E-UTRAN. The UE shall initiate this procedure only after successful security activation.

For the measId for which the measurement reporting procedure was triggered, the UE shall set the measResults within the MeasurementReport message as follows:

1> set the measId to the measurement identity that triggered the measurement reporting;

1> set the measResultPCell to include the quantities of the PCell;

1> set the measResultServFreqList to include for each E-UTRA SCell that is configured, if any, within measResultSCell the quantities of the concerned SCell, if available according to performance requirements, except if purpose for the reportConfig associated with the measId that triggered the measurement reporting is set to reportLocation;

1> if the reportConfig associated with the measId that triggered the measurement reporting includes reportAddNeighMeas:

2> for each E-UTRA serving frequency for which measObjectId is referenced in the measIdList, other than the frequency corresponding with the measId that triggered the measurement reporting:

3> set the measResultServFreqList to include within measResultBestNeighCell the physCellId and the quantities of the best non-serving cell, based on RSRP, on the concerned serving frequency;

1> if the triggerType is set to event; and if the corresponding measObject concerns NR; and if eventId is set to eventB1 or eventB2; or 1> if the triggerType is set to event; and if eventId is set to eventA3 or eventA4 or eventA5:

2> if purpose for the reportConfig associated with the measId that triggered the measurement reporting is set to a value other than reportLocation:

3> set the measResultServFreqListNR to include for each NR serving frequency, if any, the following:

4> set measResultSCell to include the available results of the NR serving cell, if meeting performance requirements;

4> if the reportConfig associated with the measId that triggered the measurement reporting includes reportAddNeighMeas:

5> set measResultBestNeighCell to include the available results of the best non-serving cell, based on RSRP;

5> for each (serving or neighbouring) cell for which the UE reports results according to the previous, additionally include the following:
6> if maxRS-IndexReport is configured, set measResult-CellRS-Index to include results of up to maxRS-IndexReport beams whose quantity is above threshRS-Index defined in the VarMeasConfig for the corresponding measObject and in order of decreasing quantity, same as used for cell reporting, and as follows:
7> include ssbIndex;
7> if reportQuantityRsIndexesNR is configured, for each quantity indicated, include the corresponding measurement result;
1> if there is at least one applicable neighbouring cell to report:
2> set the measResultNeighCells to include the best neighbouring cells up to maxReportCells in accordance with the following:
3> if the triggerType is set to event:
4> include the cells included in the cellsTriggeredList as defined within the VarMeasReportList for this measId;
3> else:
4> include the applicable cells for which the new measurement results became available since the last periodical reporting or since the measurement was initiated or reset;
The reliability of the report (i.e. the certainty it contains the strongest cells on the concerned frequency) depends on the measurement configuration i.e. the reportInterval.
3> for each cell that is included in the measResultNeighCells, include the physCellId;
3> if the triggerType is set to event; or the purpose is set to reportStrongestCells or to reportStrongestCellsForSON:
4> for each included cell, include the layer 3 filtered measured results in accordance with the reportConfig for this measId, ordered as follows:
5> if the measObject associated with this measId concerns E-UTRA:
6> set the measResult to include the quantity(ies) indicated in the reportQuantity within the concerned reportConfig in order of decreasing triggerQuantity, i.e. the best cell is included first;
5> if the measObject associated with this measId concerns NR:
6> set the measResultCell to include the quantity(ies) indicated in the reportQuantityCellNR within the concerned reportConfig in order of decreasing quantity according to bN-ThresholdYNR, i.e. the best cell is included first;
6> if maxRS-IndexReport is configured, set measResult-CellRS-Index to include results of up to maxRS-IndexReport beams whose quantity is above threshRS-Index defined in the VarMeasConfig for the corresponding measObject and in order of decreasing quantity, same as used for cell reporting, and as follows:
7> include ssbIndex;
7> if reportQuantityRsIndexesNR is configured, for each quantity indicated, include the corresponding measurement result;
5> if the measObject associated with this measId concerns UTRA FDD and if ReportConfigInterRAT includes the reportQuantityUTRA-FDD:
6> set the measResult to include the quantities indicated by the reportQuantityUTRA-FDD in order of decreasing measQuantityUTRA-FDD within the quantityConfig, i.e. the best cell is included first;
5> if the measObject associated with this measId concerns UTRA FDD and if ReportConfigInterRAT does not include the reportQuantityUTRA-FDD; or 5> if the measObject associated with this measId concerns UTRA TDD, GERAN or CDMA2000:
6> set the measResult to the quantity as configured for the concerned RAT within the quantityConfig in order of either decreasing quantity for UTRA and GERAN or increasing quantity for CDMA2000 pilotStrength, i.e. the best cell is included first;

Aerial UE at high altitude can detect more neighbor cells than ground UE. As aerial UE can see more cells, uplink power of aerial UE can affect to more cells. The neighbor cells would be far from serving cell and would not be connected to the serving cell with X2 interface. So, UE based UL interference detection is studied. The UE can report the information of neighbor cell with existing events. However, the signal strengths of neighbor cells are similar (e.g. RSRP 90-95 dBm) at high altitude. Therefore, the reports would be triggered frequently and the signaling overhead would be increased.

Figure 5:
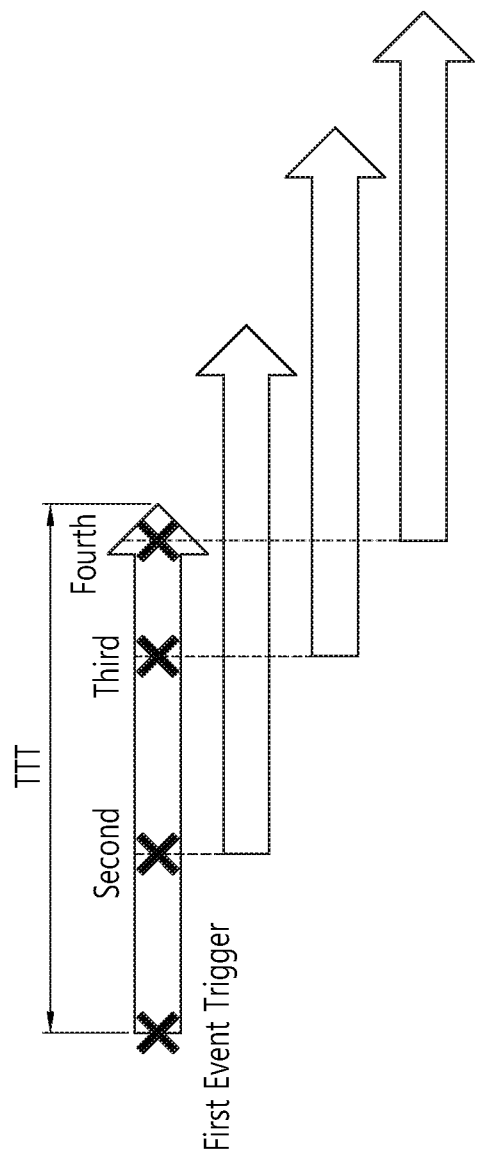
FIG. 5 shows example of measurement reporting in the prior art.

FIG. 5 shows example of measurement reporting in the prior art. Referring to FIG. 5, the UE sends measurement report 4 times when the event is triggered 4 times and does not satisfy out condition. So, enhancements of existing events or new events of measurement report (MR) are required.

At first, a method to considering number of triggering cell is studied. In this method, the UE is configured to report MR only if the number of triggering cell is above the received threshold. This method can reduce the signaling overhead. However, if the number of triggering cell is less than the threshold, UE could not report MR even the signal strength of few neighbor cells are significantly high.

Secondly, a new event of MR to report summation of neighbor cells RSRP is studied. In this event, UE is configured to report MR when the summation of neighbor cells RSRP is above the received threshold. This method can reduce the signaling overhead. However, the UL interference is meaningful when the UL TX power of UE is high. Even the summation of neighbor cells RSRP is higher than the threshold, if the SINR is high, the UL TX power would be low. Therefore, the new event can be replaced by A5 event (i.e. serving cell is lower than threshold1 and neighbor cell is higher than threshold2, when the threshold1 is RSRQ and threshold2 is RSRP) if we can reduce the signaling of A5 event.

Lastly, extending time-to-trigger (TTT) method is studied. In this method, event triggered at first and if the same event is triggered for other cells during the TTT, the value of TTT would be extended and the UE would report the information about all cells of first and second event together after extended TTT is expired. This method also can reduce the signaling overhead. However, the extended TTT can cause delay.

Therefore, further study is needed for reducing signaling overhead with considering no delay of reporting and reliability of MR.

Figure 6:
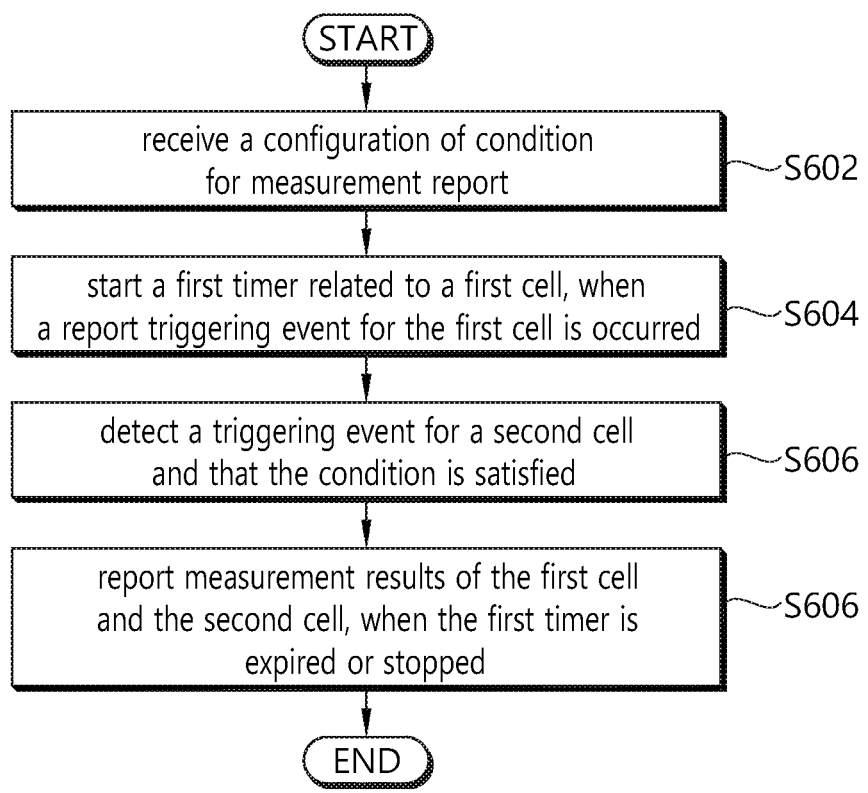
FIG. 6 shows a method for measurement report according to an embodiment of the present invention.

FIG. 6 shows a method for measurement report according to an embodiment of the present invention.

In step S602, the UE may receive a configuration of condition for measurement report.

In step S604, the UE may start a first timer related to a first cell, when a report triggering event for the first cell is occurred. The configuration may include information on a second timer which has shorter time-to-trigger (TTT) value than TTT value of the first timer.

In step S606, the UE may detect a triggering event for a second cell and that the condition is satisfied. The UE may further start the second timer when the triggering event for the second cell is satisfied. The condition may be that the second timer is expired. The measurement results may be reported when a leaving condition of the second cell is not met while the first timer and the second timer are running. The condition may be that a number of cells whose triggering event is met is above a threshold informed by a network. The condition may be that a sum of reference signal received power (RSRP) of cells whose triggering event is met is above a threshold informed by a network.

In step S608, the UE may report measurement results of the first cell and the second cell, when the first timer is expired or stopped.

According to embodiments of the present invention, signaling overhead may be reduced and there may be no extra delay.

Figure 7:
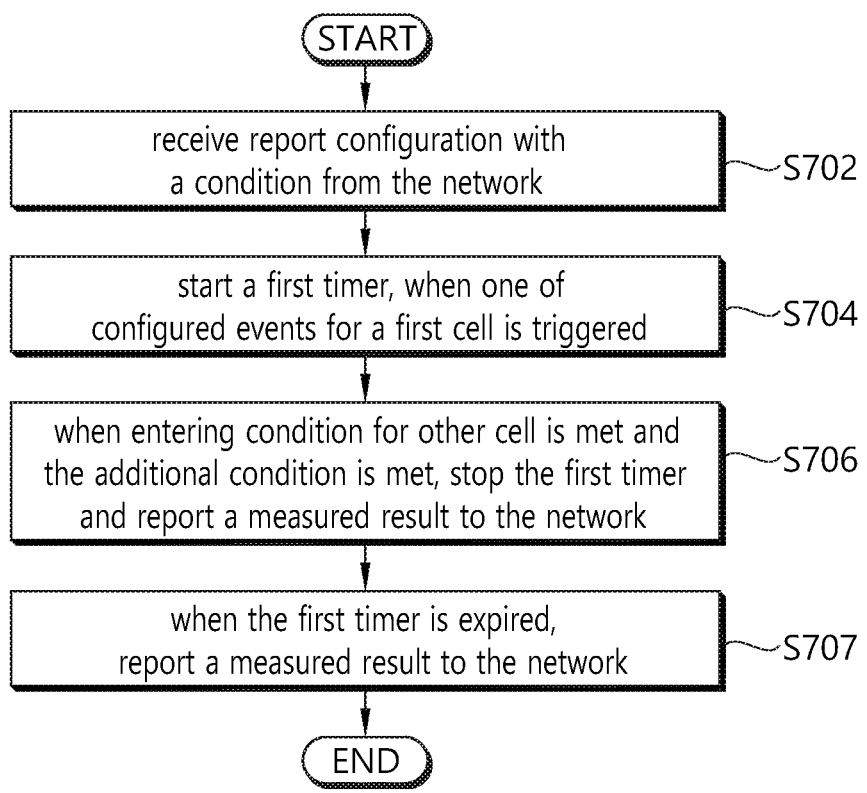
FIG. 7 shows a method for measurement reporting according to an embodiment of the present invention.

FIG. 7 shows a method for measurement reporting according to an embodiment of the present invention. The following steps may be performed by an aerial UE. In this embodiment, the aerial UE may perform event based interference detection.

In step S702, the UE may receive report configuration with a condition from the network. The condition may be referred as an additional condition to distinguish it from an entering condition or triggering condition.

In step S704, the UE may start a first timer, when one of configured events for a first cell is triggered. In other words, when the "entering condition" for the first cell is satisfied, the UE may start the first timer which has Time-To-Trigger value. A certain entering condition may be triggered in perspective of plurality of cells, but for purposed of simplicity, it is assumed that the certain entering condition is triggered for one cell. The entering condition may be a condition for measurement reporting.

In step S706, while the timer is running, when entering condition for other cell (for example, a second cell) is met and the additional condition is met, the UE may stop the first timer and reports a measured result to the network. That is, if one or more events which are same as the previously triggered are triggered for one or more other cells, and if the received additional condition is met, the UE may stop the first timer and report the measured result to the network. The measured result may include measurement results of the first cell and the one or more other cells.

The additional condition may be a condition that the number of the cells for which the entering condition is triggered is above a threshold. The threshold may be indicated by the network. The additional condition may be a condition that the sum of the qualities of the cells which the entering condition is triggered for is above a threshold. The threshold may be indicated by the network. Also, the additional condition may be a condition that the UE starts a second timer for each of the cells which the entering condition is triggered for, and when the timer expires for all the cells. The second timer may be shorter than the TTT value of the first timer and the second timer may be signaled by the network. When at least one of the additional conditions is met, the UE may consider that the additional condition is met.

In step S708, when the first timer is expired, UE may report a measured result to the network.

Figure 8:
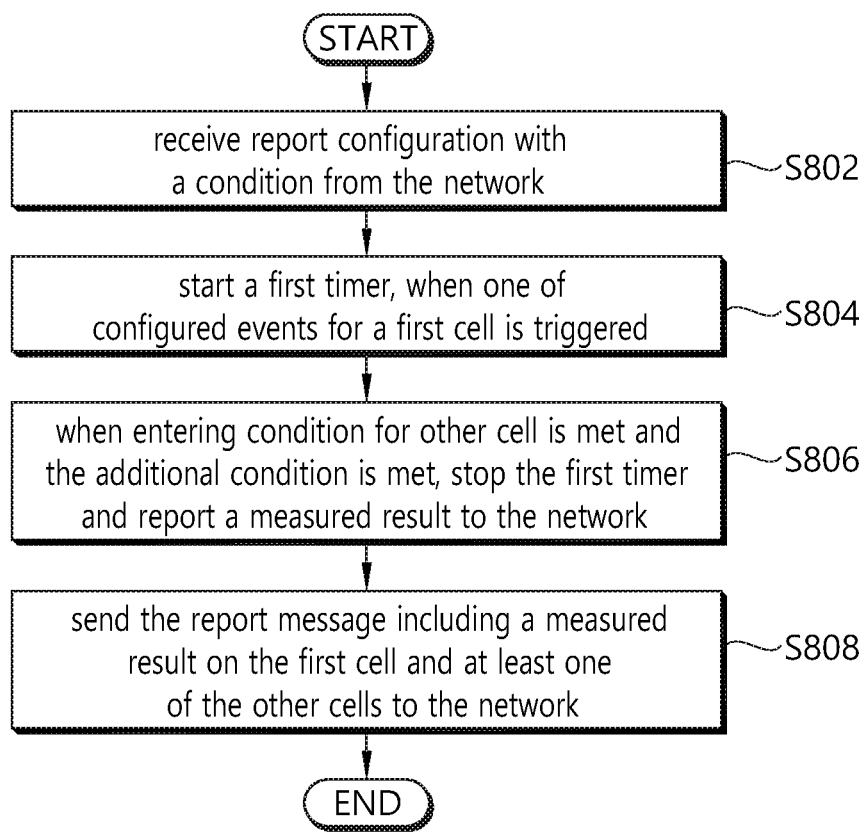
FIG. 8 shows a method for measurement reporting according to an embodiment of the present invention.

FIG. 8 shows a method for measurement reporting according to an embodiment of the present invention. The following steps may be performed by an aerial UE. In this embodiment, the aerial UE may perform reporting of neighbor cells for interference detection.

In step S802, the UE may receive report configuration with a condition from the network. The condition may be referred as an additional condition to distinguish it from an entering condition or triggering condition.

In step S804, the UE may start a first timer, when one of configured events for a first cell is triggered. In other words, when the "entering condition" for the first cell is satisfied, the UE may start the first timer which has Time-To-Trigger value. A certain entering condition may be triggered in perspective of plurality of cells, but for purposed of simplicity, it is assumed that the certain entering condition is triggered for one cell. The entering condition may be a condition for measurement reporting.

In step S806, while the timer is running, when entering condition for other cell (for example, a second cell) is met and the additional condition is met, the UE may stop the first timer and reports a measured result to the network. That is, if one or more events which are same as the previously triggered are triggered for one or more other cells, and if the received additional condition is met, the UE may include a measured result on at least one of the one or more other cells meeting the received additional condition in a report message.

The additional condition may be a condition that the number of the other cells for which the event is triggered is above a threshold. The threshold may be indicated by the network. The additional condition may be a condition that the sum of the qualities of the other cells which the event is triggered for is above a threshold indicated by the network. The additional condition may be a condition that the UE starts a second timer for each of the other cells which the event is triggered for, and when the timer expires for at least one of the cells. The second timer may be shorter than the TTT value of the first timer and the second timer may be signaled by the network. When at least one of the additional conditions is met, the UE may consider that the additional condition is met.

In step S808, the UE may send the report message including a measured result on the first cell and at least one of the other cells to the network.

Figure 9:
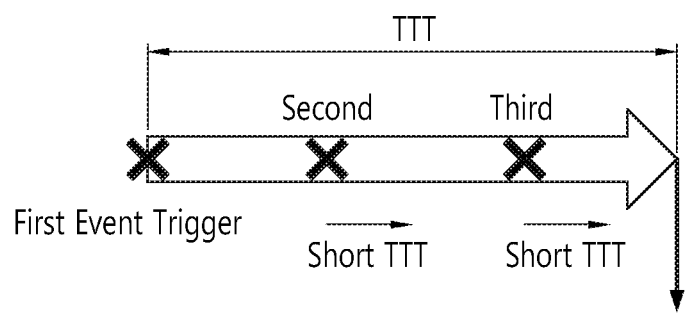
FIG. 9 shows an example of measurement reporting based on short timer according to an embodiment of the present invention.

FIG. 9 shows an example of measurement reporting based on short timer according to an embodiment of the present invention. As shown in FIG. 9, when the "entering condition" for a first cell is satisfied, the UE may start a first timer. The first timer may have a normal TTT value. A certain entering condition may be triggered in perspective of plurality of cells, but for purposed of simplicity, it is assumed that the certain entering condition is triggered for one cell. The entering condition for the first cell may be referred as a first event. After the first event is triggered, second event and third event may be triggered for a second cell and a third cell, respectively. Then, the UE may start both a second timer which has the normal TTT value and a third timer, which has shorter TTT value than the normal TTT value, for the second event and the third event. If the second event and the third event do not satisfy the "leaving condition" during short timer and until the end of TTT of first event, the UE may include measurement results of the second cell and the third cell in the potential list with measurement report of first event. In this case, at least the one cell of first event does not satisfy the "leaving condition" during TTT of the first timer.

If second cell and third cell satisfy the "leaving condition" during short timer or until the end of TTT of first timer, measurement results of the second cell and third cell are not included in the potential list. In other words, all cells in the potential list satisfy the criteria during short TTT and until the end of TTT of first timer.

After UE reports potential list, UE may clear TTT of second timer and third timer. The second cell and third cell in the reported potential list may be treated as normally reported cells after TTT.

According to embodiments of the present invention, the signaling overhead may be reduced. As shown in FIG. 9, the number of measurement reporting may be reduced by 3 times to 1 time, and there may be no extra delay. The reliability of reporting list may be guaranteed by short timer.

Figure 10:
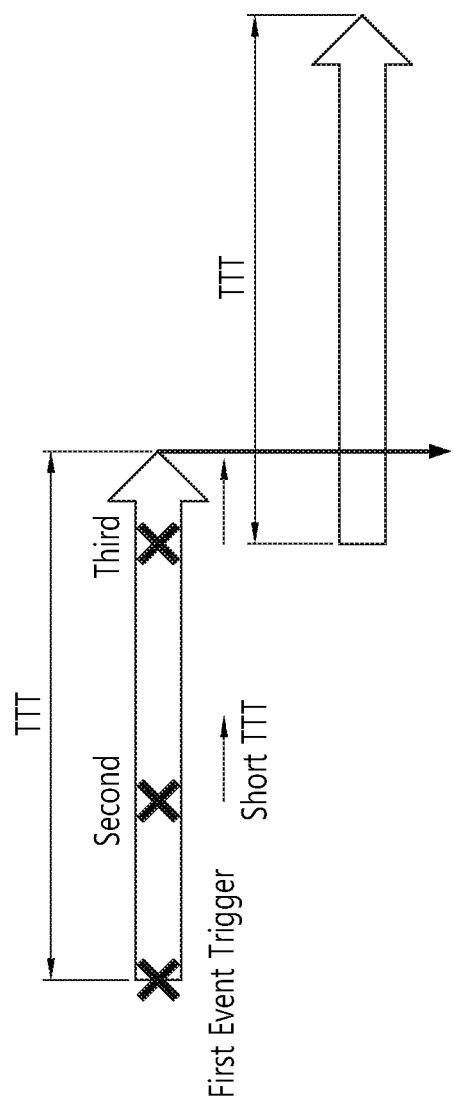
FIG. 10 shows an example of measurement reporting based on short timer according to an embodiment of the present invention.

FIG. 10 shows an example of measurement reporting based on short timer according to an embodiment of the present invention. This embodiment assumes a case that some events are not configured with the short timer. Referring to FIG. 10, the second event may satisfy the short timer but third event may not satisfy the short timer because the third event triggered late near the end of TTT of first event. Thus, the potential list may include the cells of second event which satisfy the criteria during short TTT and until the end of TTT of first event. The next TTT starts from third event triggering point. In other words, the third event becomes first event of next reporting. As shown in FIG. 10, the UE may report measurement of the first cell normally and report measurement of the second cell in potential list of the same message. The UE may clear TTT of second event. The baseline of next TTT may be third event.

Figure 11:
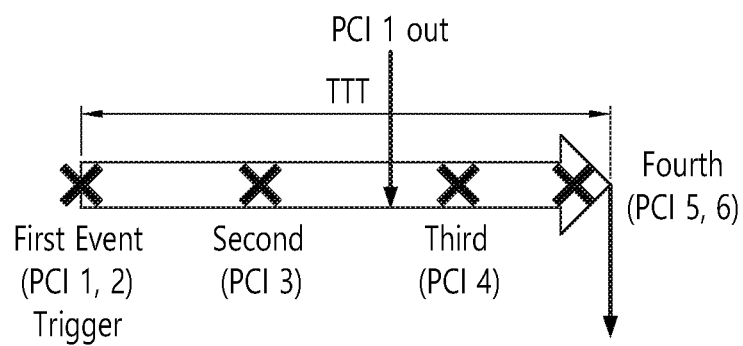
FIG. 11 shows an example of measurement reporting based on number of cells according to an embodiment of the present invention.

FIG. 11 shows an example of measurement reporting based on number of cells according to an embodiment of the present invention. If the number of cells triggered during TTT of first event is above the received threshold, UE may report potential list which includes all cells of the events which did not satisfy "leaving condition" during TTT of first event whether or not the events satisfy the short timer.

After UE reports potential list, UE may clear TTT of all reported events. The cells of reported events may be treated as normally reported cells after TTT.

According to embodiments of the present invention, the signaling overhead may be reduced. As shown in FIG. 11, the number of measurement reporting may be reduced by 4 times to 1 time, and there is no additional delay. Referring to FIG. 11, cells of third and fourth events have less reliability. However, the number of cells is above the threshold, which means the UE affects to a lot of cells and UL interference would be large. Thus, UE may report the results rapidly. Therefore, if the number of cells is above the threshold, UE may focus on rapid reporting rather than reliability. Referring to FIG. 11, even if the one cell of first event met event out condition, the remaining cells can satisfy the condition. If the number of cells is above the threshold, the UE may report potential list which includes all cells of the events when the TTT is expired whether or not the short TTT of each trigger is expired.

Figure 12:
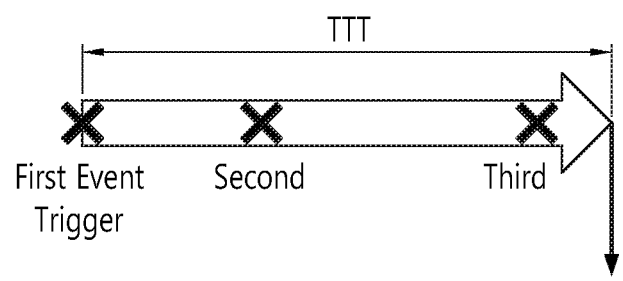
FIG. 12 shows an example of measurement reporting based on RSRP sum of neighbor cells according to an embodiment of the present invention.

FIG. 12 shows an example of measurement reporting based on RSRP sum of neighbor cells according to an embodiment of the present invention. If the RSRP sum of neighbor cells triggered during TTT of first event is above the received threshold, UE may report potential list which includes all cells of the events which did not satisfy "leaving condition" during TTT of first event whether or not the events satisfy the short timer.

After UE reports potential list, UE may clear TTT of all reported events. The cells of reported events may be treated as normally reported cells after TTT.

According to embodiments of the present invention, the signaling overhead may be reduced. As shown in FIG. 12, the number of measurement reporting may be reduced by 3 times to 1 time, and there is no additional delay. In the case, cells of third event may have less reliability. However, the RSRP sum of neighbor cells may be above the threshold. It may mean that the UE strongly affects to the neighbor cells and UL interference would be strong to the neighbor cells. Thus, UE may need to report the results rapidly. Therefore, if the number of cells is above the threshold, UE may focus on rapid reporting rather than reliability. Referring to FIG. 12, if the RSRP sum of neighbor cells is above the threshold, the UE may report all potential list of the event when the TTT is expired whether or not the short TTT of each trigger is expired.

Figure 13:
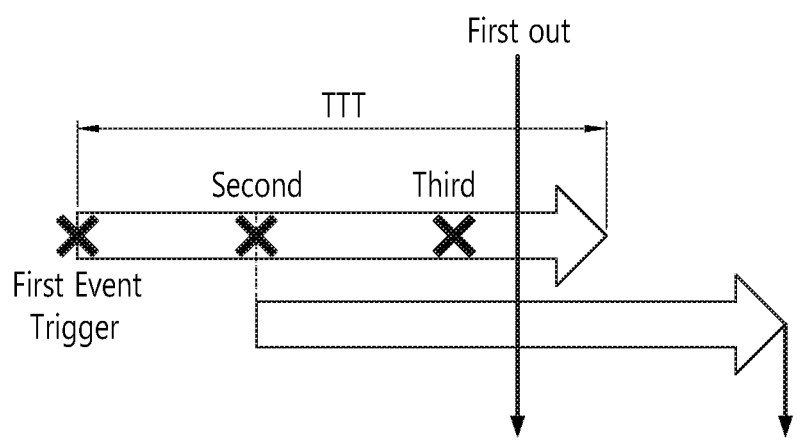
FIG. 13 shows an example of measurement reporting based on condition of other cells according to an embodiment of the present invention.

FIG. 13 shows an example of measurement reporting based on condition of other cells according to an embodiment of the present invention. This embodiment may assume a case that all cells of first triggered event satisfies "leaving event" during TTT. If all cells of first triggered event satisfied "leaving event" during TTT, the second event may become the first event. In other words, the TTT may be counted from the second event triggered point as shown in FIG. 13. If the first event met event out condition, the TTT starting baseline would be second.

Figure 14:
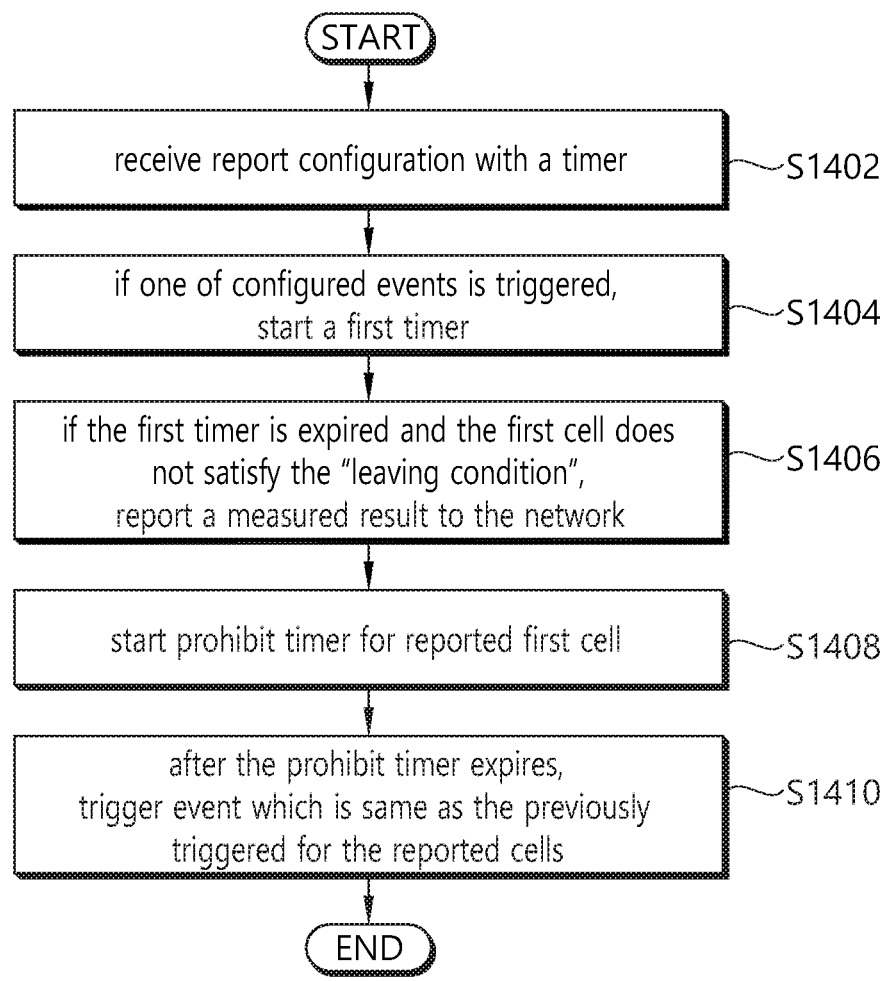
FIG. 14 shows a method for measurement reporting according to another embodiment of the present invention.

FIG. 14 shows a method for measurement reporting according to another embodiment of the present invention. In this embodiments, a measurement reporting based on a prohibit timer may be proposed.

In step S1402, the UE may receive report configuration with a timer (i.e. prohibit timer) from the network.

In step S1404, if one of configured events is triggered, the UE may start a first timer. In other words, when the "entering condition" for a first cell is satisfied, UE may start the first timer which has a TTT value.

In step S1406, if the first timer is expired and the first cell does not satisfy the "leaving condition", UE may report a measured result to the network.

In step S1408, the UE may start prohibit timer for reported first cell. In this case, the UE may not trigger event which is same as the previously triggered for the reported cells during prohibit timer.

In step S1410, after the prohibit timer expires, UE may trigger event which is same as the previously triggered for the reported cells.

According to the embodiment of the present invention, signaling overhead may be reduced and duplicated reporting during the prohibit timer may be avoided.

Figure 15:
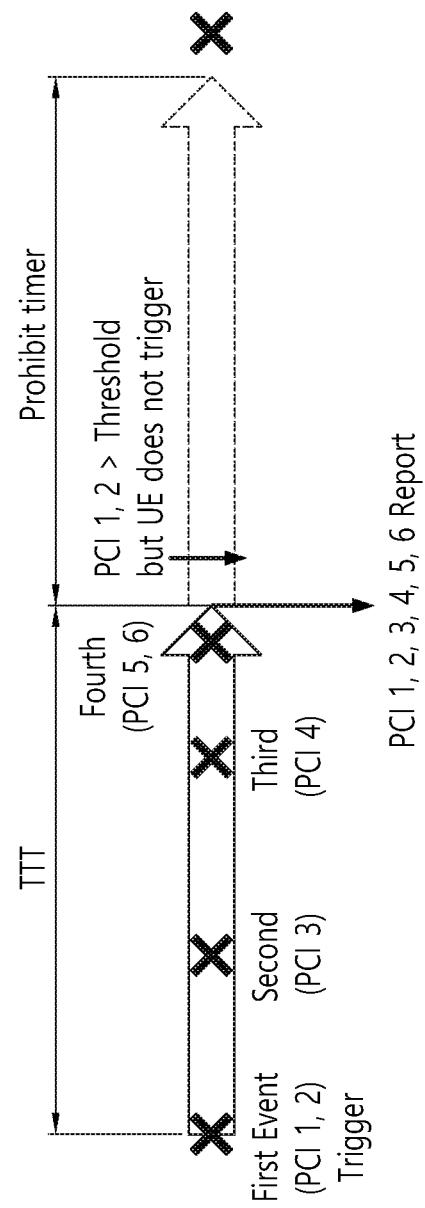
FIG. 15 shows an example of measurement reporting based on prohibit timer according to an embodiment of the present invention.

FIG. 15 shows an example of measurement reporting based on prohibit timer according to an embodiment of the present invention. As shown in FIG. 15, the UE may starts prohibit timer for all cells reported in measurement report. During the prohibit timer, UE may not trigger the same event for reported cells. It can help reducing signaling overhead.

Figure 16:
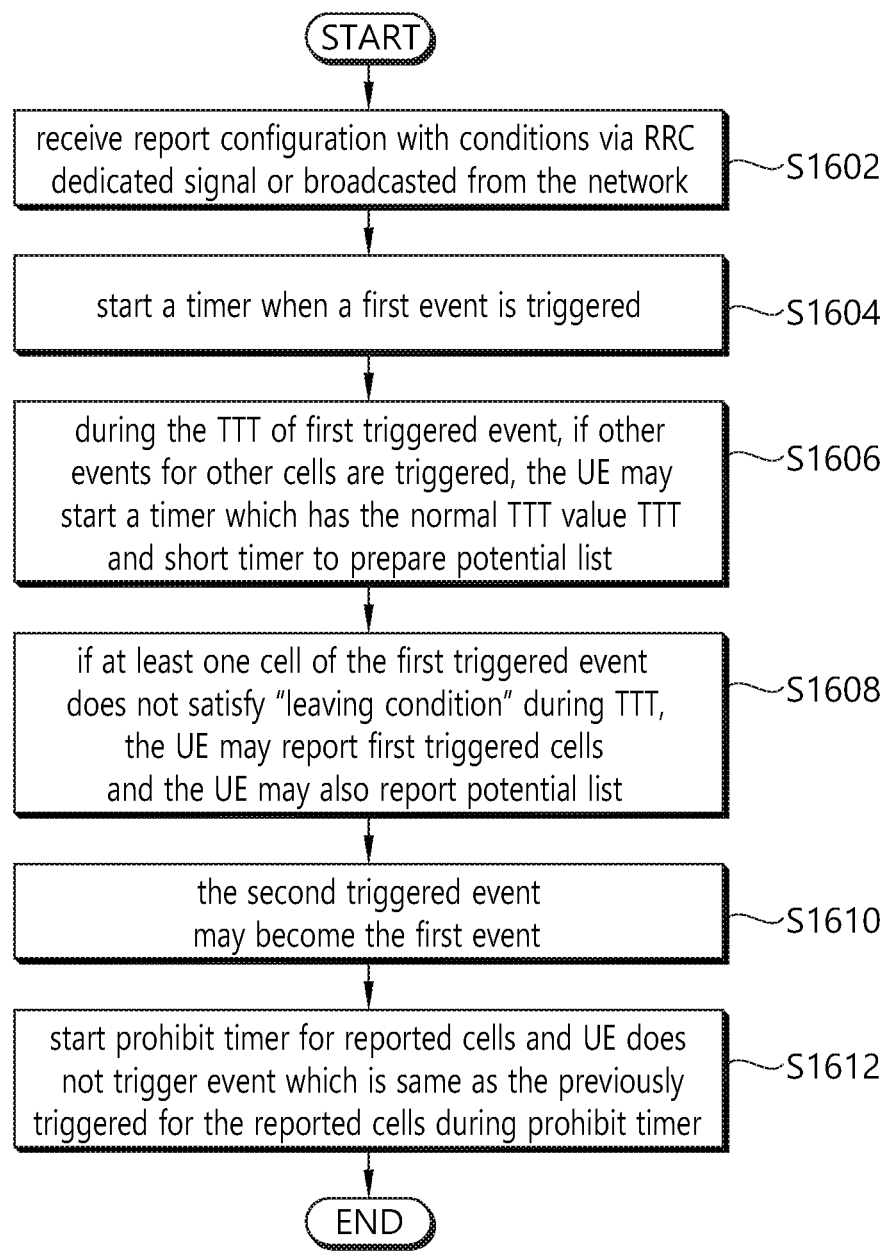
FIG. 16 shows a method for measurement reporting according to an embodiment of the present invention.

FIG. 16 shows a method for measurement reporting according to an embodiment of the present invention.

In step S1602, the UE may receive report configuration with conditions via RRC dedicated signal or broadcasted from the network.

The conditions may include at least one of criteria to report potential list (e.g. short timer which guarantee the reliability of potential list, number of cells that satisfy the event triggering criteria, and sum RSRP of neighbour cells) and a threshold (e.g. number of neighbour cells or altitude) to identify airborne UE.

In step S1604, the UE may start a timer when a first event is triggered. The first event may be "entering condition". The timer may have a normal TT value.

In step S1606, during the TTT of first triggered event, if other events for other cells are triggered, and if the UE is airborne, the UE may start a timer which has the normal TTT value TTT and short timer to prepare potential list. The short timer may have shorter TTT value than the normal TTT value.

In step S1608, if at least one cell of the first triggered event does not satisfy "leaving condition" during TTT, the UE may report first triggered cells and the UE may also report potential list. The potential list may include other cells which were triggered by the same event and did not satisfy the "leaving condition" during short timer. The UE may clear both the timer which has the normal TTT value and the short timer.

After UE reports the event and potential list, UE may regard the cells of remained oldest event, which did not satisfy the "leaving condition" but the counted time was less than short timer, as the next first triggered cells.

If the number of cells that satisfy the event entering criteria or sum of neighbor cells RSRP is above the received threshold, UE may report potential list includes all triggered cells. The reported cells may include the counted time was less than short timer.

In step S1610, the second triggered event may become the first event. During the TTT of new first triggered event which was second triggered event, UE may keep checking conditions (e.g. short timer, number of cell list, sum RSRP of neighbour cells) of already triggered same events and new triggered same events to prepare potential list.

In step S1612, the UE may start prohibit timer for reported cells and UE does not trigger event which is same as the previously triggered for the reported cells during prohibit timer.

Figure 17:
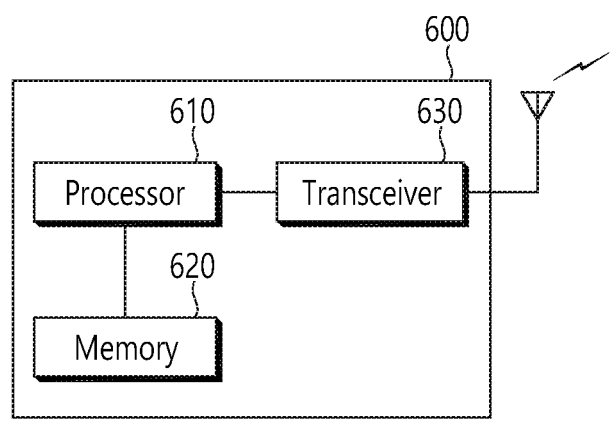
FIG. 17 shows a UE to implement an embodiment of the present invention.

FIG. 17 shows a UE to implement an embodiment of the present invention. The present invention described above for UE side may be applied to this embodiment.

A UE 600 includes a processor 610, a memory 620 and a transceiver 630. The processor 610 may be configured to implement proposed functions, procedures and/or methods described in this description. Layers of the radio interface protocol may be implemented in the processor 610.

Specifically, the processor 610 is configured to receive a configuration of condition for measurement report.

The processor 610 is configured to start a first timer related to a first cell, when a report triggering event for the first cell is occurred. The configuration may include information on a second timer which has shorter time-to-trigger (TTT) value than TTT value of the first timer.

The processor 610 is configured to detect a triggering event for a second cell and that the condition is satisfied. The UE may further start the second timer when the triggering event for the second cell is satisfied. The condition may be that the second timer is expired. The measurement results may be reported when a leaving condition of the second cell is not met while the first timer and the second timer are running. The condition may be that a number of cells whose triggering event is met is above a threshold informed by a network. The condition may be that a sum of reference signal received power (RSRP) of cells whose triggering event is met is above a threshold informed by a network.

The processor 610 is configured to report measurement results of the first cell and the second cell, when the first timer is expired or stopped.

The memory 620 is operatively coupled with the processor 610 and stores a variety of information to operate the processor 610. The transceiver 630 is operatively coupled with the processor 610, and transmits and/or receives a radio signal.

The processor 610 may include application-specific integrated circuit (ASIC), other chipset, logic circuit and/or data processing device. The memory 620 may include read-only memory (ROM), random access memory (RAM), flash memory, memory card, storage medium and/or other storage device. The transceiver 630 may include baseband circuitry to process radio frequency signals. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

According to embodiments of the present invention, signaling overhead may be reduced and there may be no extra delay.

Figure 18:
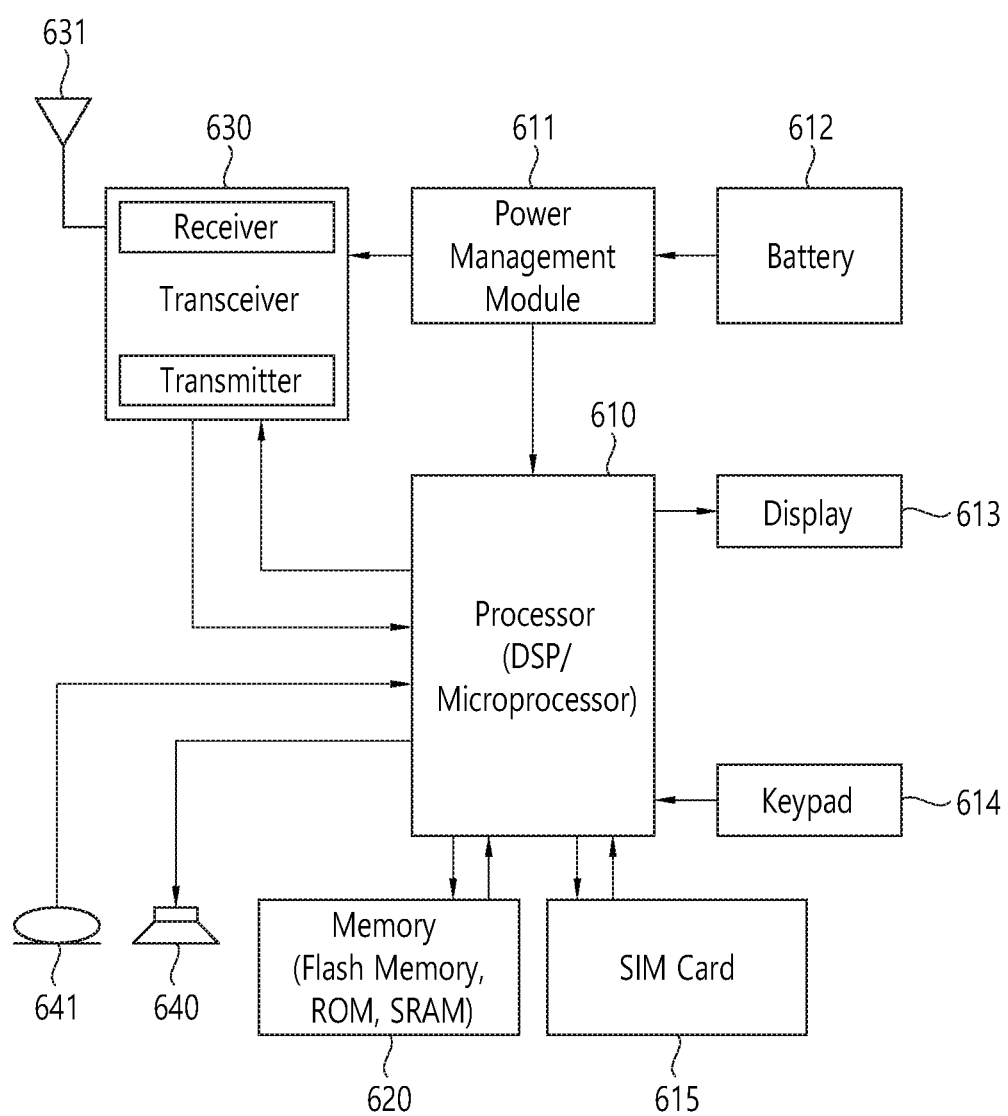
FIG. 18 shows more detailed UE to implement an embodiment of the present invention.

FIG. 18 shows more detailed UE to implement an embodiment of the present invention. The present invention described above for UE side may be applied to this embodiment.

A UE includes a processor 610, a power management module 611, a battery 612, a display 613, a keypad 614, a subscriber identification module (SIM) card 615, a memory 620, a transceiver 630, one or more antennas 631, a speaker 640, and a microphone 641.

The processor 610 may be configured to implement proposed functions, procedures and/or methods described in this description. Layers of the radio interface protocol may be implemented in the processor 610. The processor 610 may include ASIC, other chipset, logic circuit and/or data processing device. The processor 610 may be an application processor (AP). The processor 610 may include at least one of a digital signal processor (DSP), a central processing unit (CPU), a graphics processing unit (GPU), a modem (modulator and demodulator). An example of the processor 610 may be found in SNAPDRAGON™ series of processors made by Qualcomm®, EXYNOS™ series of processors made by Samsung®, A series of processors made by Apple®, HELIO™ series of processors made by Media Tek®, ATOM™ series of processors made by Intel® or a corresponding next generation processor.

The processor 610 is configured to receive a configuration of condition for measurement report.

The processor 610 is configured to start a first timer related to a first cell, when a report triggering event for the first cell is occurred. The configuration may include information on a second timer which has shorter time-to-trigger (TTT) value than TTT value of the first timer.

The processor 610 is configured to detect a triggering event for a second cell and that the condition is satisfied. The UE may further start the second timer when the triggering event for the second cell is satisfied. The condition may be that the second timer is expired. The measurement results may be reported when a leaving condition of the second cell is not met while the first timer and the second timer are running. The condition may be that a number of cells whose triggering event is met is above a threshold informed by a network. The condition may be that a sum of reference signal received power (RSRP) of cells whose triggering event is met is above a threshold informed by a network.

The processor 610 is configured to report measurement results of the first cell and the second cell, when the first timer is expired or stopped.

The power management module 611 manages power for the processor 610 and/or the transceiver 630. The battery 612 supplies power to the power management module 611.

The display 613 outputs results processed by the processor 610. The keypad 614 receives inputs to be used by the processor 610. The keypad 614 may be shown on the display 613. The SIM card 615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 620 is operatively coupled with the processor 610 and stores a variety of information to operate the processor 610. The memory 620 may include ROM, RAM, flash memory, memory card, storage medium and/or other storage device. When the embodiments are implemented in software, the techniques described herein can be implemented with modules (e.g., procedures, functions, and so on) that perform the functions described herein. The modules can be stored in the memory 620 and executed by the processor 610. The memory 620 can be implemented within the processor 610 or external to the processor 610 in which case those can be communicatively coupled to the processor 610 via various means as is known in the art.

The transceiver 630 is operatively coupled with the processor 610, and transmits and/or receives a radio signal. The transceiver 630 includes a transmitter and a receiver. The transceiver 630 may include baseband circuitry to process radio frequency signals. The transceiver 630 controls the one or more antennas 631 to transmit and/or receive a radio signal.

The speaker 640 outputs sound-related results processed by the processor 610. The microphone 641 receives sound-related inputs to be used by the processor 610.

According to embodiments of the present invention, signaling overhead may be reduced and there may be no extra delay.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method performed by a user equipment (UE) in a wireless communication system, the method comprising:
   receiving a configuration of condition for measurement report;
   starting a first timer related to a first cell, when a report triggering event for the first cell is occurred;
   detecting a triggering event for a second cell and that the condition is satisfied; and
   reporting measurement results of the first cell and the second cell, when the first timer is expired or stopped.

2. The method of claim 1, wherein the configuration includes information on a second timer which has shorter time-to-trigger (TTT) value than TTT value of the first timer.

3. The method of claim 2, further comprising:
   starting the second timer when the triggering event for the second cell is satisfied.

4. The method of claim 3, wherein the condition is that the second timer is expired.

5. The method of claim 4, wherein the measurement results are reported when a leaving condition of the second cell is not met while the first timer and the second timer are running.

6. The method of claim 1, wherein the condition is that a number of cells whose triggering event is met is above a threshold informed by a network.

7. The method of claim 1, wherein the condition is that a sum of reference signal received power (RSRP) of cells whose triggering event is met is above a threshold informed by a network.

8. The method of claim 1, further comprising:
   deleting the measurement results after reporting the measurement results.

9. The method of claim 1, wherein the configuration includes information on prohibit timer.

10. The method of claim 9, further comprising:
    prohibiting report of the measurement results after reporting the measurement results, while the prohibit timer is running.

11. A user equipment (UE) in a wireless communication system, the UE comprising:
    a transceiver for transmitting or receiving a radio signal; and
    a processor coupled to the transceiver,
    the processor configured to:
    control the transceiver to receive a configuration of condition for measurement report;
    start a first timer related to a first cell, when a report triggering event for the first cell is occurred;
    detect a triggering event for a second cell and that the condition is satisfied; and
    control the transceiver to report measurement results of the first cell and the second cell, when the first timer is expired or stopped.

12. The UE of claim 11, wherein the configuration includes information on a second timer which has shorter time-to-trigger (TTT) value than TTT value of the first timer.

13. The UE of claim 12, wherein the processor is further configured to:
    start the second timer when the triggering event for the second cell is satisfied.

14. The UE of claim 13, wherein the condition is that the second timer is expired.

15. A processor for a wireless communication device in a wireless communication system,
wherein the processor is configured to control the wireless communication device to:
control the transceiver to receive a configuration of condition for measurement report;
start a first timer related to a first cell, when a report triggering event for the first cell is occurred;
detect a triggering event for a second cell and that the condition is satisfied; and
control the transceiver to report measurement results of the first cell and the second cell, when the first timer is expired or stopped.

* * * * *